Oct. 12, 1937.　　　G. L. DIMMICK　　　2,095,317

PHOTOGRAPHIC SOUND RECORDER

Filed Sept. 27, 1934　　3 Sheets-Sheet 1

INVENTOR
GLENN L. DIMMICK
BY
ATTORNEY

Oct. 12, 1937.　　　　G. L. DIMMICK　　　　2,095,317

PHOTOGRAPHIC SOUND RECORDER

Filed Sept. 27, 1934　　　3 Sheets-Sheet 2

INVENTOR
GLENN L. DIMMICK
BY
ATTORNEY

Oct. 12, 1937.  G. L. DIMMICK  2,095,317
PHOTOGRAPHIC SOUND RECORDER
Filed Sept. 27, 1934  3 Sheets-Sheet 3
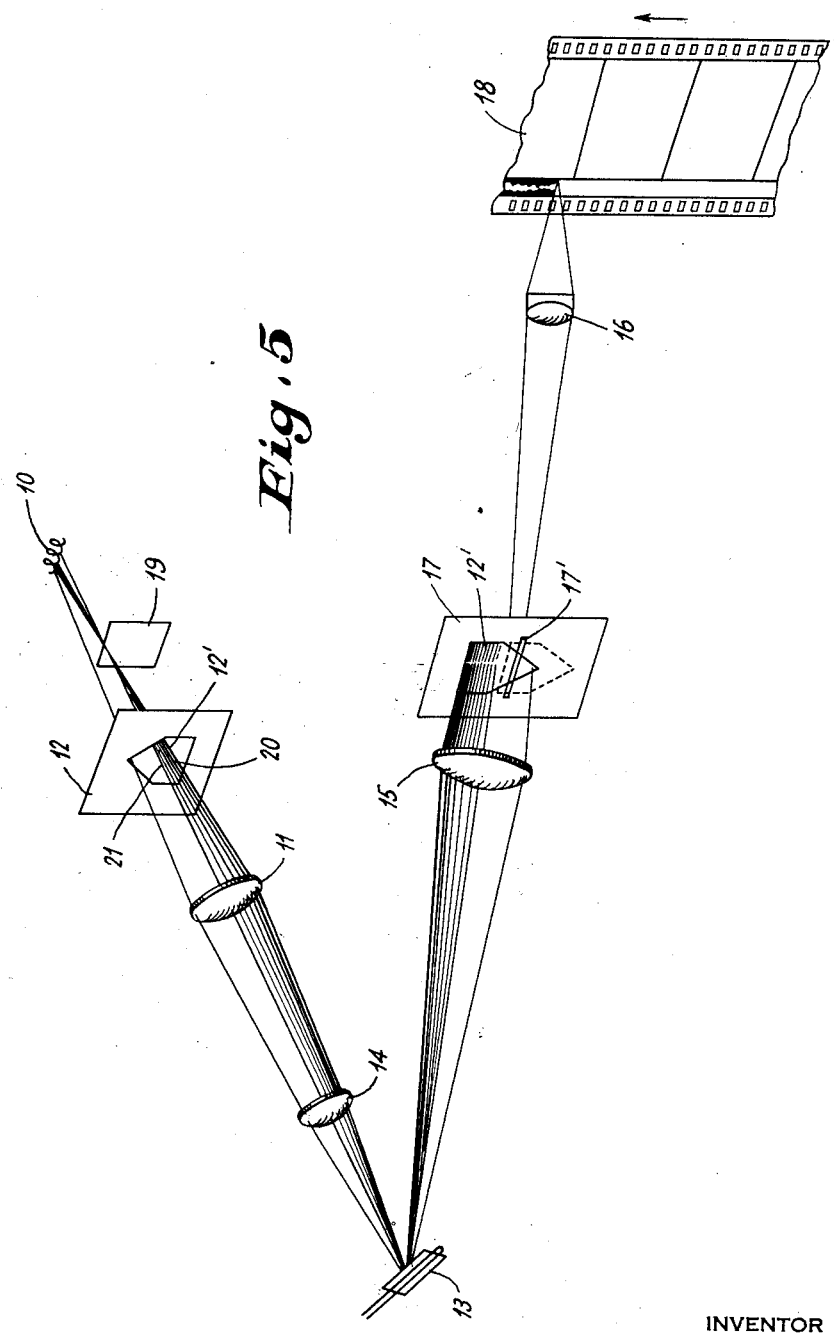
INVENTOR
GLENN L. DIMMICK
BY
ATTORNEY Patented Oct. 12, 1937

2,095,317

UNITED STATES PATENT OFFICE 2,095,317

PHOTOGRAPHIC SOUND RECORDER

Glenn L. Dimmick, Oaklyn, N. J., assignor to Radio Corporation of America, a corporation of Delaware Application September 27, 1934, Serial No. 745,793

4 Claims. (Cl. 179—100.3)

This invention relates to an improved sound recording apparatus and more particularly to an optical system for recording sound upon photographic film by either the variable width or variable density methods selected.

In the performance of my invention I use a modification of the apparatus shown, described and claimed in E. W. Kellogg application Serial No. 621,787, filed July 11, 1932, and I modify the apparatus of the aforesaid application by the substitution of a different aperture plate and the addition of a light stop adjacent to the exciter lamp.

One object of my invention is to provide a novel type of optical system capable of recording sound on photographic film either by the variable density method or variable width method at the option of the operator.

Another object of my invention is to provide an apparatus for recording by the variable density method which eliminates the distortions due to variable slit width in the light valve system of such recording.

Another object of my invention is the elimination of the distortions incidental to a glow lamp in variable density recording.

Another object of my invention is to provide an optical system which is capable of monitoring the amplitude directly by means of an auxiliary variable amplitude beam from the galvanometer in variable density recording.

Another object of my invention is to provide a variable intensity light beam which is movable over a slit and in which the variation in intensity is uniform.

Figure 1:
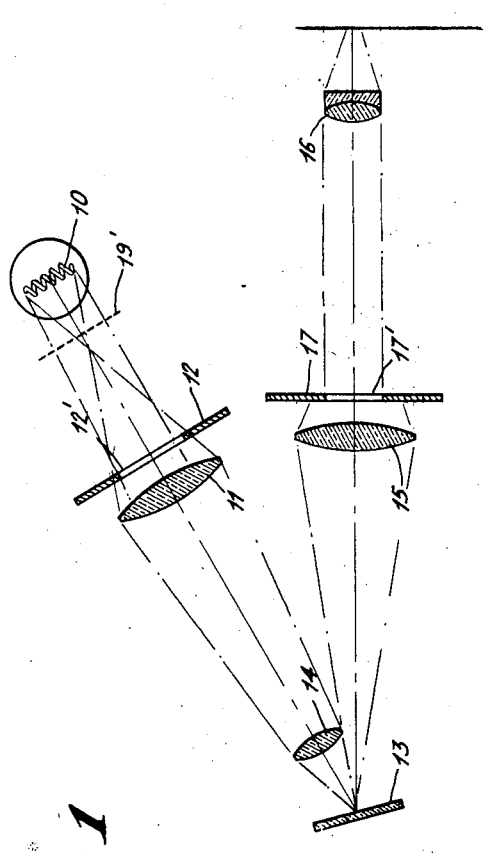
Figure 2:
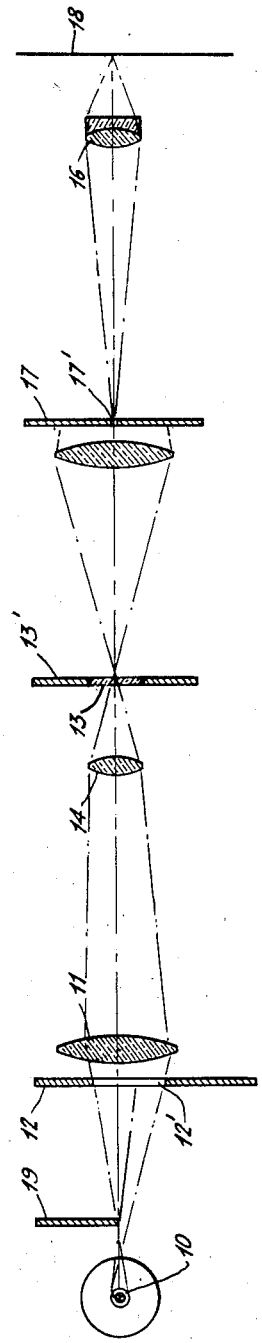
Figure 3:
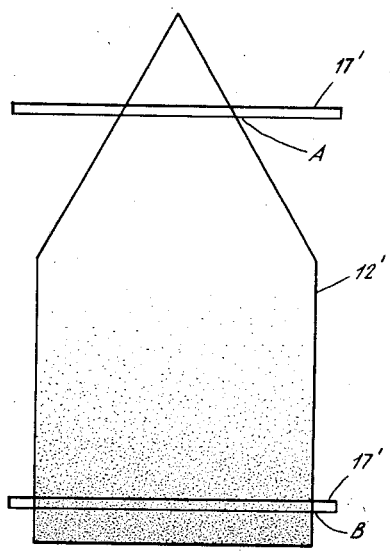
Figure 4:
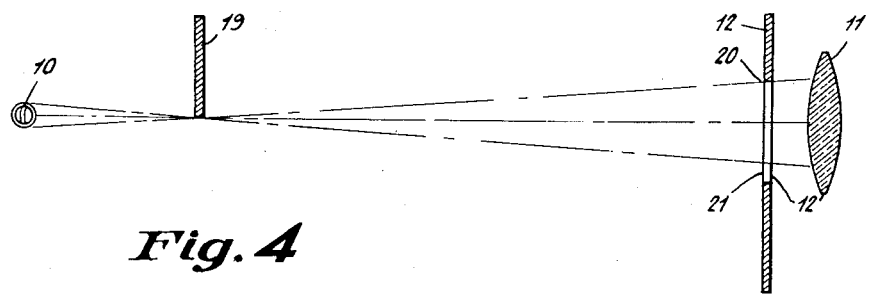

Other and incidental objects of my invention will be apparent to those skilled in the art from a reading of the following specification and an inspection of the accompanying drawings in which:

Fig. 1 is a longitudinal section of my optical system taken horizontally thereof, Fig. 2 is a longitudinal section of my optical system in the vertical plane and with the galvanometer mirror indicated as an aperture, Fig. 3 is an illustration of a type of light spot produced upon the slit in my apparatus, Fig. 4 is a greatly enlarged detail showing the arrangement of the stop for producing the variable density light spot, and Fig. 5 is similar to Fig. 1 except that the various elements are arranged in somewhat more perspective relation with respect to one another.

Referring first to Figs. 1 and 2 showing the optical system in general corresponding to my aforesaid application Serial No. 621,787 and with the modifications thereof described in detail 10 indicates the filament of the exciter lamp from which light passes to the condenser lens 11 through the aperture plate 12 being further directed to the galvanometer mirror 13 by the additional lens 14. It will be noted that in Fig. 2 the entire optical system is shown in alignment and the galvanometer mirror is indicated as a transparent aperture in an opaque diaphragm 13'. From the galvanometer mirror the light is reflected to the lens 15 which focusses the light from the mirror 13 upon the objective lens 16 and this objective lens 16 focusses an image of the slit in the plate 17 upon the film 18, the said slit being indicated at 17'. The aperture 12' in the aperture plate 12 has the configuration indicated in Fig. 3 i. e., it is a rectangular portion with a triangular portion adjacent thereto. During operation in the usual manner for variable width recording, the galvanometer mirror 13 which vibrates about an axis in the plane of the paper in Fig. 1 is so adjusted that the aperture 12' is imaged upon the slit 17' as indicated at A in Fig. 3. It will be apparent that vibrations of the mirror 13 upon a horizontal axis will cause vertical movement of the image of the aperture 12' over the slit 17' and this, being imaged by the lens 16 upon the film 18, will produce a variable width sound track.

When I desire to record by the variable density method I change the adjustment of the galvanometer mirror 13 so as to image the aperture 12' upon the slit 17' at the position indicated at B in Fig. 3 and vibration of the galvanometer mirror then moves the rectangular portion of the aperture 12' up and down over the slit 17'.

In order to secure a variable light intensity in this variable portion of the aperture 12' I insert a stop 19 in the position shown in Figs. 2 and 5 and shown in more detail in Fig. 4. Since the filament 10 is of uniform intensity, it will be apparent that the light passing the stop 19 will vary in intensity from the point 20 where the illumination reaches zero to a maximum at the point 21 of the aperture 12', and this variation in intensity will be perfectly uniform producing an area of variable illumination as indicated in Fig. 5 by the shaded portion of the light beam. In order to readjust the apparatus for variable width recording, it is only necessary to readjust the mirror to image the triangular portion of the aperture 12' upon the slit 17'. Any suitable mechanism may be provided for moving the rest position of the galvanometer mirror 13 so as to cause either the constant light and triangular part of the beam to vibrate across the slit 17 or to cause the rectangular and variable density part of the beam to vibrate across the slit 17.

In conjunction with the foregoing apparatus, I may employ visual means for monitoring the light beam impressed upon the film as shown in Taylor Patent No. 1,847,636 and it will be apparent that the foregoing method permits a visual monitoring of a variable density recording in the manner heretofore accomplished in variable area recording. I may conveniently merely insert a partial reflector in the optical system and reflect the image of the optical system adjacent the slit 17' and reflect an image of the entire spot rather than merely the illuminated portion of the slit onto a white card screen visible to the operator.

I may also apply ground noise reduction to my system as shown, described and claimed in Hanna Patent No. 1,888,724 or in Robinson Patent No. 1,854,159 in which case I adjust the apparatus so that with variable width recording at no signal the point of the triangular portion of the image of the aperture 12' is at the slit 17' and as the amplitude of the signal increases the image is shifted until the mean position of the middle portion thereof is at the slit 17' at maximum modulation. With variable density recording in this apparatus and using ground noise reduction, it is of course necessary to reverse the connections of the ground noise reduction apparatus so that the extreme lower portion of the rectangular section of the aperture is emitted upon the slit at minimum modulation thereby producing minimum exposure of the negative and the middle of the rectangular portion then approaches the slit as modulation is increased.

It will be apparent that by shifting the aforesaid rectangular image having a uniform gradient in illumination up and down over the slit 17 I produce a variation in exposure proportional to the swing of the galvanometer mirror and which is not subject to the usual distortions in variable density recording, such, for example, as change in relative intensity between the ends and middle of the image when a light valve is used, distortion due to the variation in width of the aperture with constant intensity when a light valve is used and distortion due to the peculiar shape of the characteristic curve when a glow lamp is used.

It will be further apparent that by the use of the stop 19 the shadow produced on the rectangular portion of the aperture 12' has a perfectly uniform gradient in intensity which is secured optically as distinguished from the irregularities in such gradient which might result if an attempt were made to use, for example, a screen of photographically graduated density or a variable density wedge.

I claim:

1. Sound recording apparatus comprising a light source, an aperture positioned to be illuminated by said light source, a stop positioned between said light source and said aperture for graduating the illumination of said aperture, and means for selecting the portion of said aperture which is to be imaged on a sound record area.

2. Sound recording apparatus comprising a light source, an aperture positioned to be illuminated by said light source, a stop positioned between said light source and said aperture for graduating the illumination of said aperture, means for selecting the portion of said aperture which is to be imaged on a sound record area, and means for moving the image in relation to the selecting means.

3. In sound recording apparatus, a light source of finite area, means for directing a beam of light from said source through a slit on to a sound record film, means for vibrating said beam of light across said slit in accordance with the sound to be recorded, and an opaque stop so positioned in relation to said source as to produce a graduated intensity of the beam directed on to said slit.

4. In sound recording apparatus, a light source of finite area, means for directing a beam of light from said source through a slit on to a sound record film, means for vibrating said beam of light across said slit in accordance with the sound to be recorded, an opaque stop so positioned in relation to said source as to produce a graduated intensity of the beam directed on to said slit, and an apertured stop between said light source and said vibrating means defining a portion of said beam of uniform intensity and transversely varying area.

GLENN L. DIMMICK.